(12) United States Patent
Nakajima et al.

(10) Patent No.: US 11,139,657 B2
(45) Date of Patent: Oct. 5, 2021

(54) POWER CONVERSION SYSTEM AND CONTROL METHOD THEREFOR

(71) Applicant: Sumitomo Electric Industries, Ltd., Osaka (JP)

(72) Inventors: Yoshiharu Nakajima, Osaka (JP); Naoki Ayai, Osaka (JP); Yusuke Shimizu, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 504 days.

(21) Appl. No.: 15/765,921

(22) PCT Filed: Oct. 20, 2016

(86) PCT No.: PCT/JP2016/081043
§ 371 (c)(1),
(2) Date: Apr. 4, 2018

(87) PCT Pub. No.: WO2017/126175
PCT Pub. Date: Jul. 27, 2017

(65) Prior Publication Data
US 2018/0287390 A1 Oct. 4, 2018

(30) Foreign Application Priority Data
Jan. 18, 2016 (JP) .............................. JP2016-006999

(51) Int. Cl.
*H02J 7/35* (2006.01)
*H02J 3/38* (2006.01)
(Continued)

(52) U.S. Cl.
CPC ............... *H02J 3/385* (2013.01); *H02J 3/32* (2013.01); *H02J 3/383* (2013.01); *H02J 7/0068* (2013.01);
(Continued)

(58) Field of Classification Search
CPC ... H02M 2001/007; H02J 3/383; H02J 7/0068
See application file for complete search history.

(56) References Cited

U.S. PATENT DOCUMENTS

2004/0112320 A1* 6/2004 Bolz ..................... H02P 9/307
 123/179.28
2012/0201064 A1* 8/2012 Asakura ............ H02M 7/53871
 363/98
(Continued)

FOREIGN PATENT DOCUMENTS

AU 201408820 B2 * 4/2016
CN 102723762 A 10/2012
(Continued)

OTHER PUBLICATIONS

Leyva-Ramos, J., M. G. Ortiz-Lopez, L. H. Diaz-Saldierna, and M. Martinez-Cruz. "Average current controlled switching regulators with cascade boost converters." IET power electronics 4, No. 1 (2011): 1-10. (Year: 2011).*

(Continued)

*Primary Examiner* — Peter M Novak
(74) *Attorney, Agent, or Firm* — Baker Botts L.L.P.; Michael A. Sartori

(57) ABSTRACT

This power conversion system is composed of a DC power supply circuit and a power conditioner which are connected to each other. The power conditioner includes: a first DC/DC converter provided between the DC power supply circuit and a DC bus; and an inverter provided between the DC bus and an AC electric path and configured to perform switching operation in such a manner that the inverter and the first DC/DC converter alternately have stop periods in an AC half cycle. The DC power supply circuit includes: a storage battery; and a second DC/DC converter of a bidirectional type, provided between the storage battery and the first DC/DC converter and including a DC reactor. The power conversion system includes a control unit configured to control current flowing through the DC reactor of the second DC/DC converter to have a constant value.

16 Claims, 14 Drawing Sheets

(51) Int. Cl.
  *H02M 7/48* (2007.01)
  *H02M 3/156* (2006.01)
  *H02J 3/32* (2006.01)
  *H02J 7/00* (2006.01)
  *H02M 3/158* (2006.01)
  *H02M 7/5387* (2007.01)
  *H02M 1/00* (2006.01)

(52) U.S. Cl.
  CPC .............. *H02J 7/35* (2013.01); *H02M 3/156* (2013.01); *H02M 3/158* (2013.01); *H02M 7/48* (2013.01); *H02M 7/53871* (2013.01); *H02M 1/007* (2021.05)

(56) References Cited

U.S. PATENT DOCUMENTS

| | | | | |
|---|---|---|---|---|
| 2014/0247029 | A1* | 9/2014 | Krabbenborg | H02M 3/156 323/282 |
| 2014/0339902 | A1* | 11/2014 | Sepe, Jr. | H02J 7/345 307/80 |
| 2015/0109828 | A1* | 4/2015 | Koo | H02M 3/33561 363/17 |
| 2015/0244287 | A1* | 8/2015 | Narita | H02M 7/53871 363/124 |

FOREIGN PATENT DOCUMENTS

| | | |
|---|---|---|
| CN | 104756392 A | 7/2015 |
| EP | 2922192 A1 | 9/2015 |
| JP | H10-031525 A | 2/1998 |
| JP | 2014-054025 A | 3/2014 |
| JP | 2014-241714 A | 12/2014 |
| JP | 2014-241715 A | 12/2014 |
| JP | 2015-142460 A | 8/2015 |
| JP | 2015-192549 A | 11/2015 |
| WO | 2014/068686 A1 | 5/2014 |
| WO | 2015/063234 A1 | 5/2015 |

OTHER PUBLICATIONS

Wu, T.F., Chang, C.H. and Wu, Y.J., 1999. Single-stage converters for PV lighting systems with MPPT and energy backup. IEEE transactions on aerospace and electronic systems, 35(4), pp. 1306-1317. (Year: 1999).*

* cited by examiner

POWER CONVERSION SYSTEM AND CONTROL METHOD THEREFOR

TECHNICAL FIELD

The present invention relates to a power conversion system and a control method therefor.

This application claims priority on Japanese Patent Application No. 2016-006999 filed on Jan. 18, 2016, the entire contents of which are to be incorporated herein by reference.

BACKGROUND ART

For example, a power conditioner (power conversion device) for photovoltaic generation operates to convert DC generated power to AC power and perform system interconnection to a commercial power system. In conventional power conditioner conversion operation, generated voltage is stepped up to certain voltage higher than the AC-side peak voltage by a step-up circuit, and then is converted to AC voltage by an inverter. In this case, the step-up circuit and the inverter always perform high-speed switching operations.

Meanwhile, in such power conditioners, it is important to improve the conversion efficiency. Accordingly, the following control (hereinafter, referred to as a minimum switching conversion method) has been proposed: the DC-side voltage and the absolute value of the AC-side instantaneous voltage are always compared with each other, the step-up circuit is caused to perform switching operation during only a period in which step-up operation is needed, and the inverter is caused to perform switching operation during only a period in which step-down operation is needed (for example, see Patent Literature 1, 2). If the period in which the switching operation is stopped is provided to the step-up circuit and the inverter owing to such a minimum switching conversion method, switching loss and the like are reduced by the amounts corresponding to the stop period, whereby the conversion efficiency can be improved.

In recent years, a so-called complex-type power conditioner has been proposed which performs DC/AC power conversion using two types of DC power supplies, i.e., a solar battery and a storage battery (for example, see Patent Literature 3, 4). Such a complex-type power conditioner enables output from one or a plurality of photovoltaic panels and output from a storage battery to be connected to one power conditioner. In the power conditioner, a DC/DC converter (chopper circuit) and an inverter are provided as necessary in accordance with each power supply, whereby system interconnection operation with a commercial power system can be performed.

CITATION LIST

Patent Literature

PATENT LITERATURE 1: Japanese Laid-Open Patent Publication No. 2014-241714
PATENT LITERATURE 2: Japanese Laid-Open Patent Publication No. 2014-241715
PATENT LITERATURE 3: Japanese Laid-Open Patent Publication No. 2015-142460
PATENT LITERATURE 4: Japanese Laid-Open Patent Publication No. 2015-192549

SUMMARY OF INVENTION

One expression of the present invention is a power conversion system composed of a DC power supply circuit and a power conditioner which are connected to each other, wherein the power conditioner includes: a first DC/DC converter provided between the DC power supply circuit and a DC bus; and an inverter provided between the DC bus and an AC electric path and configured to perform switching operation in such a manner that the inverter and the first DC/DC converter alternately have stop periods in an AC half cycle, and the DC power supply circuit includes: a storage battery; and a second DC/DC converter of a bidirectional type, provided between the storage battery and the first DC/DC converter and including a DC reactor, the power conversion system comprising a control unit configured to control current flowing through the DC reactor of the second DC/DC converter to have a constant value.

Another aspect of the present invention is a control method for a power conversion system, to be mainly executed by the power conversion system, the power conversion system being composed of a DC power supply circuit and a power conditioner which are connected to each other, the power conditioner including: a first DC/DC converter provided between the DC power supply circuit and a DC bus; and an inverter provided between the DC bus and an AC electric path, the DC power supply circuit including: a storage battery; and a second DC/DC converter of a bidirectional type, provided between the storage battery and the first DC/DC converter and including a DC reactor, wherein the second DC/DC converter steps up voltage on the storage battery to voltage on a low-voltage side of the first DC/DC converter, or performs is step-down operation in a direction opposite thereto, the first DC/DC converter and the inverter perform switching operations so as to alternately have stop periods in an AC half cycle, and current flowing through the DC reactor of the second DC/DC converter is controlled to have a constant value.

DESCRIPTION OF EMBODIMENTS

Figure 1:
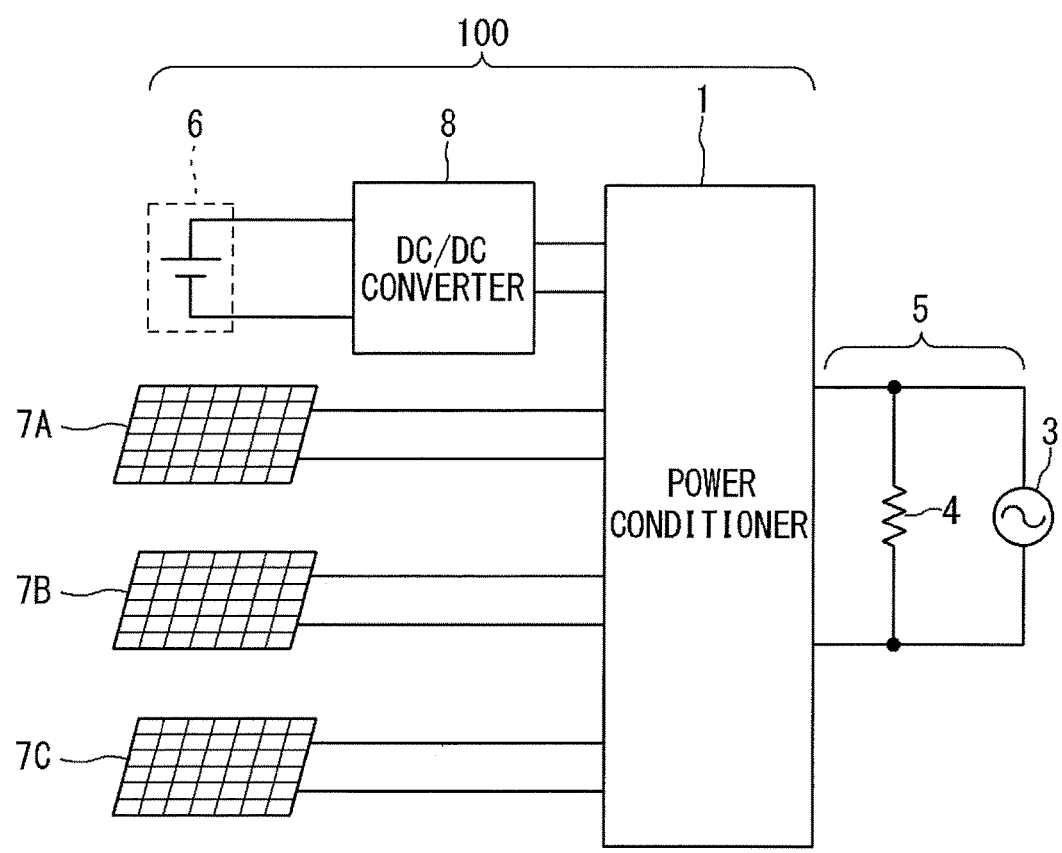
FIG. 1 is a diagram showing an example of the schematic configuration of a power conversion system.

Problems to be Solved by the Disclosure

For the complex-type power conditioners, in particular, there is an actual need of connecting various types of storage batteries thereto. However, if use of various types of storage batteries is assumed, the range of the terminal voltages thereof is wide. Further, in actual, use of a storage battery having voltage out of the assumed range is sometimes desired. At present, the power conditioners cannot adequately adapt to such circumstances.

Meanwhile, in a case of applying a minimum switching conversion method while using a storage battery as a DC power supply, charge/discharge current flowing through the storage battery pulsates. This is because reactive current due to DC bus voltage not being constant cannot be perfectly absorbed by an electrolytic capacitor connected in parallel to the storage battery. Although this does not immediately lead to a problem, in comparison between DC current having a constant value and pulsating current, loss caused by the internal resistance of the storage battery in the latter case is greater.

Considering the above problems, an object of the present disclosure is to increase the versatility for various types of storage batteries and reduce loss in the storage batteries, in a power conversion system.

Effects of the Disclosure

According to the present disclosure, it is possible to increase the versatility for various types of storage batteries and reduce loss in the storage batteries, in a power conversion system.

SUMMARY OF EMBODIMENTS

Summary of embodiments of the present invention includes at least the following.

(1) This is a power conversion system composed of a DC power supply circuit and a power conditioner which are connected to each other, wherein the power conditioner includes: a first DC/DC converter provided between the DC power supply circuit and a DC bus; and an inverter provided between the DC bus and an AC electric path and configured to perform switching operation in such a manner that the inverter and the first DC/DC converter alternately have stop periods in an AC half cycle, and the DC power supply circuit includes: a storage battery; and a second DC/DC converter of a bidirectional type, provided between the storage battery and the first DC/DC converter and including a DC reactor, the power conversion system comprising a control unit configured to control current flowing through the DC reactor of the second DC/DC converter to have a constant value.

In the power conversion system configured as described above, even if there is a great difference in input/output voltage between the power conditioner and the storage battery, step-up/step-down operation can be performed, and the voltage applicable range is expanded. Therefore, it is possible to connect various types of storage batteries having different output voltages, to the power conditioner via the second DC/DC converter. In addition, in the minimum switching conversion method in which the first DC/DC converter and the inverter alternately have switching stop periods in the AC half cycle, current having a pulsating current waveform attempts to flow to the low-voltage side of the first DC/DC converter. However, by the control unit performing control for causing current flowing through the DC reactor of the second DC/DC converter to have a constant value through, for example, control for causing voltage on the low-voltage side of the first DC/DC converter (on the high-voltage side of the second DC/DC converter) to have a constant value, only DC current flows through the storage battery and the current having a pulsating current waveform does not flow. As a result, loss due to the internal resistance of the storage battery is suppressed, deterioration in the storage battery is delayed, and the performance of the storage battery can be fully exerted.

(2) In the power conversion system of (1), the control unit may determine, as a charge/discharge current target value, a value obtained by averaging, over a certain cycle, a value calculated by multiplying an operation amount of voltage feedback control on a high-voltage side of the second DC/DC converter by a value obtained by dividing a voltage target value on the high-voltage side by a voltage detection value on a low-voltage side thereof, and may control voltage on the high-voltage side of the second DC/DC converter to be constant voltage.

In this case, flat DC current having undergone the averaging processing can be caused to flow to the low-voltage side of the second DC/DC converter. That is, the second DC/DC converter can control charge/discharge current for the storage battery to be constant current that does not have a pulsating current waveform.

(3) In the power conversion system of (2), for example, the following expression may be satisfied:

$$\mathrm{igdc\_ref} = \frac{1}{T}\int_{t}^{t+T}\left(\mathrm{ipwm\_ref\_pi\_vdc} \times \frac{\mathrm{vdc\_ref}}{\mathrm{vgdc}}\right)dt,$$

where T is the cycle,
igdc_ref is the charge/discharge current target value,
ipwm_ref_pi_vdc is the operation amount,
vdc_ref is the voltage target value, and
vgdc is the voltage detection value.

Through this calculation, it is possible to control the charge/discharge current target value for the storage battery to be constant current that does not pulsate.

(4) In the power conversion system of (1), the control unit may determine, as a current target value for a DC reactor included in the first DC/DC converter, a value obtained by averaging, over an AC half cycle, a compensation amount based on voltage feedback on a low-voltage side of the first DC/DC converter, and may control voltage on the low-voltage side of the first DC/DC converter to be constant voltage.

In this case, flat DC current having undergone the averaging processing can be caused to flow to the low-voltage side of the first DC/DC converter. Therefore, it is possible to control voltage on the low-voltage side of the first DC/DC converter to have a constant value.

(5) In the power conversion system of (2) or (3), the power conditioner may be a complex-type power conditioner connected also to one or a plurality of photovoltaic panels, and the second DC/DC converter may output, to the high-voltage side, voltage that coincides with the highest one of output voltages of the photovoltaic panels.

In a case where the second DC/DC converter outputs voltage that coincides with the highest one of output voltages of the photovoltaic panels to the high-voltage side, the power conditioner can optimize operation in the minimum switching conversion method.

(6) Similarly, the power conditioner of (4) may be a complex-type power conditioner connected also to one or a plurality of photovoltaic panels, and the first DC/DC converter may output, to the low-voltage side, voltage that coincides with the highest one of output voltages of the photovoltaic panels.

(7) In the power conversion system of (2), (3), or (5), when the second DC/DC converter controls voltage on the high-voltage side thereof to be constant voltage, the second DC/DC converter may perform communication for receiving a voltage target value to achieve the constant voltage, from the power conditioner.

In this case, through the communication, the power conditioner can notify the second DC/DC converter of the output voltage target value on the high-voltage side. For example, in a case where voltage that coincides with the highest one of output voltages of the photovoltaic panels is used for voltage of the DC bus, it is possible to notify the second DC/DC converter of the output voltage target value. Thus, the second DC/DC converter can output voltage that coincides with the highest one of output voltages of the photovoltaic panels, to the high-voltage side. In addition, as a result, the switching stop period of the first DC/DC converter increases, and this contributes to optimization of the operation in the minimum switching conversion method.

(8) In the power conversion system of (4) or (6), when the first DC/DC converter controls voltage on the low-voltage side thereof to be constant voltage, the first DC/DC converter may perform communication for transmitting an output power command value to the second DC/DC converter.

In this case, by the second DC/DC converter being notified of the output power command value, the second DC/DC converter can control the charge/discharge current to be constant current based on the output power command value.

(9) On the other hand, a method aspect is a control method for a power conversion system. The control method is mainly executed by the power conversion system, and the power conversion system is composed of a DC power supply circuit and a power conditioner which are connected to each other, the power conditioner including: a first DC/DC converter provided between the DC power supply circuit and a DC bus; and an inverter provided between the DC bus and an AC electric path, the DC power supply circuit including: a storage battery; and a second DC/DC converter of a bidirectional type, provided between the storage battery and the first DC/DC converter and including a DC reactor.

In the control method, the second DC/DC converter steps up voltage on the storage battery to voltage on a low-voltage side of the first DC/DC converter, or performs step-down operation in a direction opposite thereto, the first DC/DC converter and the inverter perform switching operations so as to alternately have stop periods in an AC half cycle, and current flowing through the DC reactor of the second DC/DC converter is controlled to have a constant value.

In the control method for the power conversion system as described above, even if there is a difference in input/output voltage between the power conditioner and the storage battery, the second DC/DC converter can mediate between their respective voltages. Therefore, it is possible to connect various types of storage batteries having different output voltages, to the power conditioner via the second DC/DC converter. In addition, in the minimum switching conversion method in which the first DC/DC converter and the inverter alternately have switching stop periods in the AC half cycle, current having a pulsating current waveform attempts to flow to the low-voltage side of the first DC/DC converter. However, by performing control for causing current flowing through the DC reactor of the second DC/DC converter to have a constant value through, for example, control for causing voltage on the low-voltage side of the first DC/DC converter (on the high-voltage side of the second DC/DC converter) to have a constant value, only DC current flows through the storage battery and the current having a pulsating current waveform does not flow. As a result, loss due to the internal resistance of the storage battery is suppressed, deterioration in the storage battery is delayed, and the performance of the storage battery can be fully exerted.

(10) Aside from (1), the power conversion system can also be expressed as follows. That is, this is a power conversion system composed of a DC power supply circuit and a power conditioner which are connected to each other, wherein the power conditioner includes: a first DC/DC converter provided between the DC power supply circuit and a DC bus; and an inverter provided between the DC bus and an AC electric path and configured to perform switching operation in such a manner that the inverter and the first DC/DC converter alternately have stop periods in an AC half cycle, and the DC power supply circuit includes: a storage battery; and a second DC/DC converter of a bidirectional type, provided between the storage battery and the first DC/DC converter and including a DC reactor, the power conversion system comprising: a capacitor provided between the first DC/DC converter and the second DC/DC converter; and a control unit configured to control current flowing through the DC reactor of the second DC/DC converter to have a constant value, by the capacitor supplying a pulsating component of pulsating current flowing through the first DC/DC converter, and by the second DC/DC converter supplying a DC component of the pulsating current.

DETAILS OF EMBODIMENTS

Hereinafter, the details of the embodiments will be described with reference to the drawings.

First Embodiment

First, a power conversion system (including a control method therefor) according to the first embodiment will be described.

<<Circuit Configuration>>

FIG. 1 is a diagram showing an example of the schematic configuration of a power conversion system 100. The power conversion system 100 is composed of a complex-type power conditioner 1 and a plurality of and plural types of DC power supplies connected thereto, and is capable of system interconnection with a commercial power system 3. A consumer's load 4 is connected to an AC electric path 5 between the commercial power system 3 and the power conditioner 1. In FIG. 1, for example, three photovoltaic panels 7A, 7B, 7C are connected to the complex-type power conditioner 1. The number "three" is merely an example. A storage battery 6 is connected to the power conditioner 1 via a bidirectional DC/DC converter 8. Specifically, the low-voltage side (left side in FIG. 1) of the DC/DC converter 8 is connected to the storage battery 6, and the high-voltage side (right side in FIG. 1) thereof is connected to the power conditioner 1.

Here, as an example of numerical values, voltage of the commercial power system 3 is AC 202V, and the peak value (wave crest value) in this case is about 286V. Voltage that has been inputted from the photovoltaic panels 7A, 7B, 7C to a DC/DC converter (not shown) in the power conditioner 1 and has undergone MPPT (Maximum Power Point Tracking) control, is DC 250V. This voltage becomes DC bus voltage in the power conditioner 1. On the other hand, voltage of the storage battery 6 is DC 39-53V. Therefore, voltage of the storage battery 6 is stepped up by the DC/DC converter 8, and further, stepped up to DC 250V by a DC/DC converter 11 (FIG. 2) in the power conditioner 1.

The basic effect obtained by providing the DC/DC converter 8 is that, even if there is a great difference in input/output voltage between the power conditioner 1 and the storage battery 6, step-up/step-down operation can be performed, and the voltage applicable range is expanded. Therefore, it is possible to connect various types of storage batteries 6 having different output voltages, to the power conditioner 1 via the DC/DC converter 8.

Figure 2:
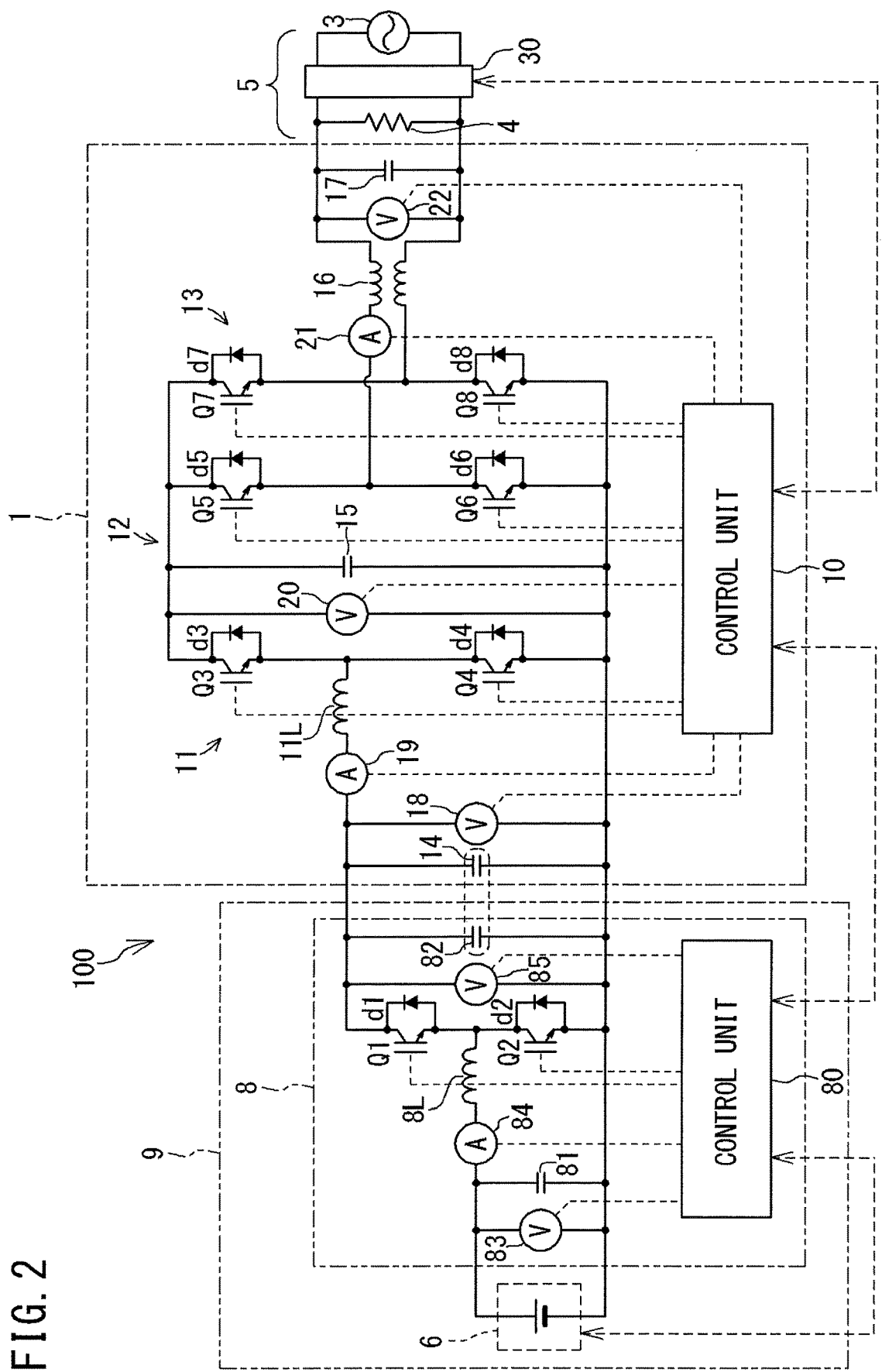
FIG. 2 is an example of a circuit diagram showing the details of the power conversion system, focusing on only a storage battery in FIG. 1.

FIG. 2 is an example of a circuit diagram showing the details of the power conversion system 100, focusing on only the storage battery 6 in FIG. 1. The power conditioner 1 and the DC/DC converter 8 are provided between the AC electric path 5 and the storage battery 6. On the AC electric path 5, a power monitor 30 for the AC electric path 5 is provided, though not shown in FIG. 1.

In actual, the storage battery 6 is configured as not a mere battery but a power storage system, and has a monitor function of monitoring the state of the storage battery 6 itself, and a communication function for exchanging information with outside (the details will be described later).

The power conditioner 1 includes, as main circuit elements: the DC/DC converter 11; a DC bus 12 on the high-voltage side thereof; an inverter 13 connected to the DC bus 12; a low-voltage-side capacitor 14 connected to the low-voltage side of the DC/DC converter 11; an intermediate capacitor 15 connected to the DC bus 12; an AC reactor 16; and an AC-side capacitor 17. The high-voltage side of the DC/DC converter 8 is connected to the low-voltage side of the DC/DC converter 11. The inverter 13 is connected to the high-voltage side of the DC/DC converter 11.

The DC/DC converter 11 includes, as circuit elements composing a chopper circuit: a DC reactor 11L; a high-side switching element Q3 and a diode d3 connected in antiparallel thereto; and a low-side switching element Q4 and a diode d4 connected in antiparallel thereto.

The inverter 13 is composed of switching elements Q5, Q6, Q7, Q8 connected in a full-bridge form. Diodes d5, d6, d7, d8 are connected in antiparallel to the switching elements Q5, Q6, Q7, Q8, respectively.

Each of the DC/DC converter 8 and the DC/DC converter 11 can be used in a bidirectional manner, and operates as a step-up chopper when the storage battery 6 is discharged, and operates as a step-down chopper when the storage battery 6 is charged. The inverter 13 is capable of not only performing conversion from DC to AC but operating as a bidirectional DC/AC converter, and thus also capable of performing conversion from AC to DC in the opposite direction.

As the switching elements Q3 to Q8, for example, IGBTs (Insulated Gate Bipolar Transistors) shown in the drawing or MOSFETs (Metal-Oxide Semiconductor Field-Effect Transistors) can be used.

The AC reactor 16 and the AC-side capacitor 17 form a filter circuit to prevent a high-frequency component generated in the inverter 13 from leaking to the AC electric path 5.

As circuit elements for measurement, provided are: a voltage sensor 18 for detecting voltage between both ends of the low-voltage-side capacitor 14; a current sensor 19 for detecting current flowing through the DC reactor 11L; a voltage sensor 20 for detecting voltage of the DC bus 12, i.e., voltage between both ends of the intermediate capacitor 15; a current sensor 21 for detecting current flowing through the AC reactor 16; and a voltage sensor 22 for detecting voltage between both ends of the AC-side capacitor 17. A detected output signal from each sensor is sent to a control unit 10.

The control unit 10 controls ON and OFF of the switching elements Q3, Q4, Q5 to Q8.

The control unit 10 includes, for example, a computer, and achieves a necessary control function by the computer executing software (computer program). The software is stored in a storage device (not shown) of the control unit. However, it is also possible to configure the control unit 10 from only a hardware circuit not including a computer.

The DC/DC converter 8 includes, as a chopper circuit: a DC reactor 8L; a high-side switching element Q1 and a diode d1 connected in antiparallel thereto; and a low-side switching element Q2 and a diode d2 connected in antiparallel thereto. A low-voltage-side capacitor 81 is connected to the low-voltage side of the DC/DC converter 8, and a high-voltage-side capacitor 82 is connected to the high-voltage side thereof. As the switching elements Q1, Q2, for example, IGBTs or MOSFETs can be used.

As circuit elements for measurement, provided are: a voltage sensor 83 for detecting voltage between both ends of the capacitor 81; a current sensor 84 for detecting current flowing through the DC reactor 8L; and a voltage sensor 85 for detecting voltage between both ends of the high-voltage-side capacitor 82. A detected output signal from each sensor is sent to a control unit 80.

The control unit 80 controls ON and OFF of the switching elements Q1, Q2.

The control unit 80 includes, for example, a computer, and achieves a necessary control function by the computer executing software (computer program). The software is stored in a storage device (not shown) of the control unit. However, it is also possible to configure the control unit 80 from only a hardware circuit not including a computer.

The DC/DC converter 8 and the storage battery 6 form a DC power supply circuit 9. That is, the power conversion system 100 is formed by connecting the DC power supply circuit 9 and the power conditioner 1 to each other. The power conditioner 1 includes: the first DC/DC converter 11 provided between the DC power supply circuit 9 and the DC bus 12; and the inverter 13 which is provided between the DC bus 12 and the AC electric path 5 and which performs switching operation in such a manner that the inverter 13 and the first DC/DC converter 11 alternately have stop periods in the AC half cycle.

The second DC/DC converter 8 of the DC power supply circuit 9 is provided between the storage battery 6 and the first DC/DC converter 11, and is a bidirectional converter including the DC reactor 8L.

The control unit 10 and the control unit 80 have communication functions. The control unit 10 can perform necessary communication with the power monitor 30 and the control unit 80. The control unit 80 can perform necessary communication with the storage battery 6 and the control unit 10.

<<Explanation of Minimum Switching Conversion Method>>

Figure 3:
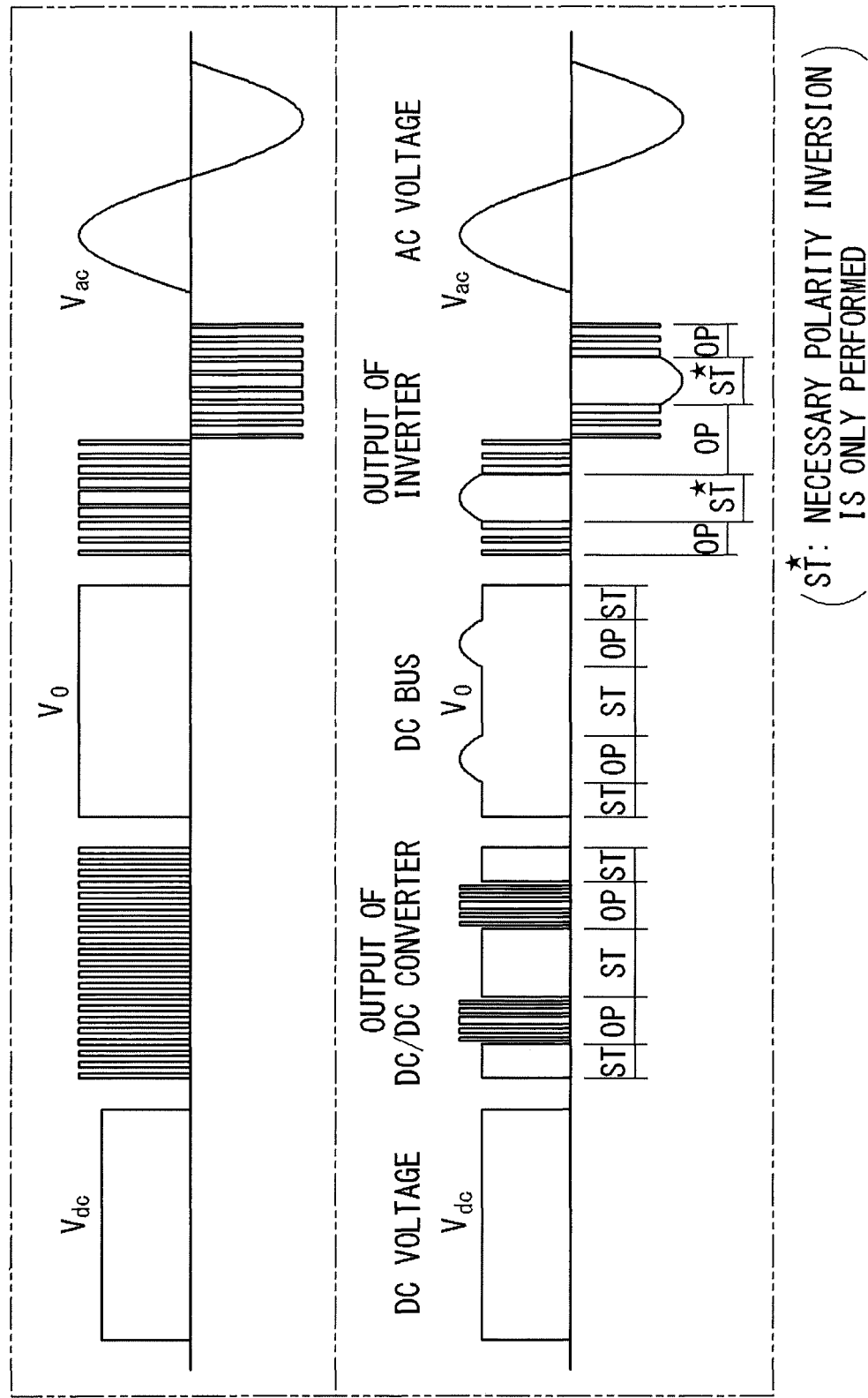
FIG. 3 is a waveform diagram (horizontally depicted) schematically showing the features of operations of a DC/DC converter and an inverter in a minimum switching conversion method.
Figure 4:
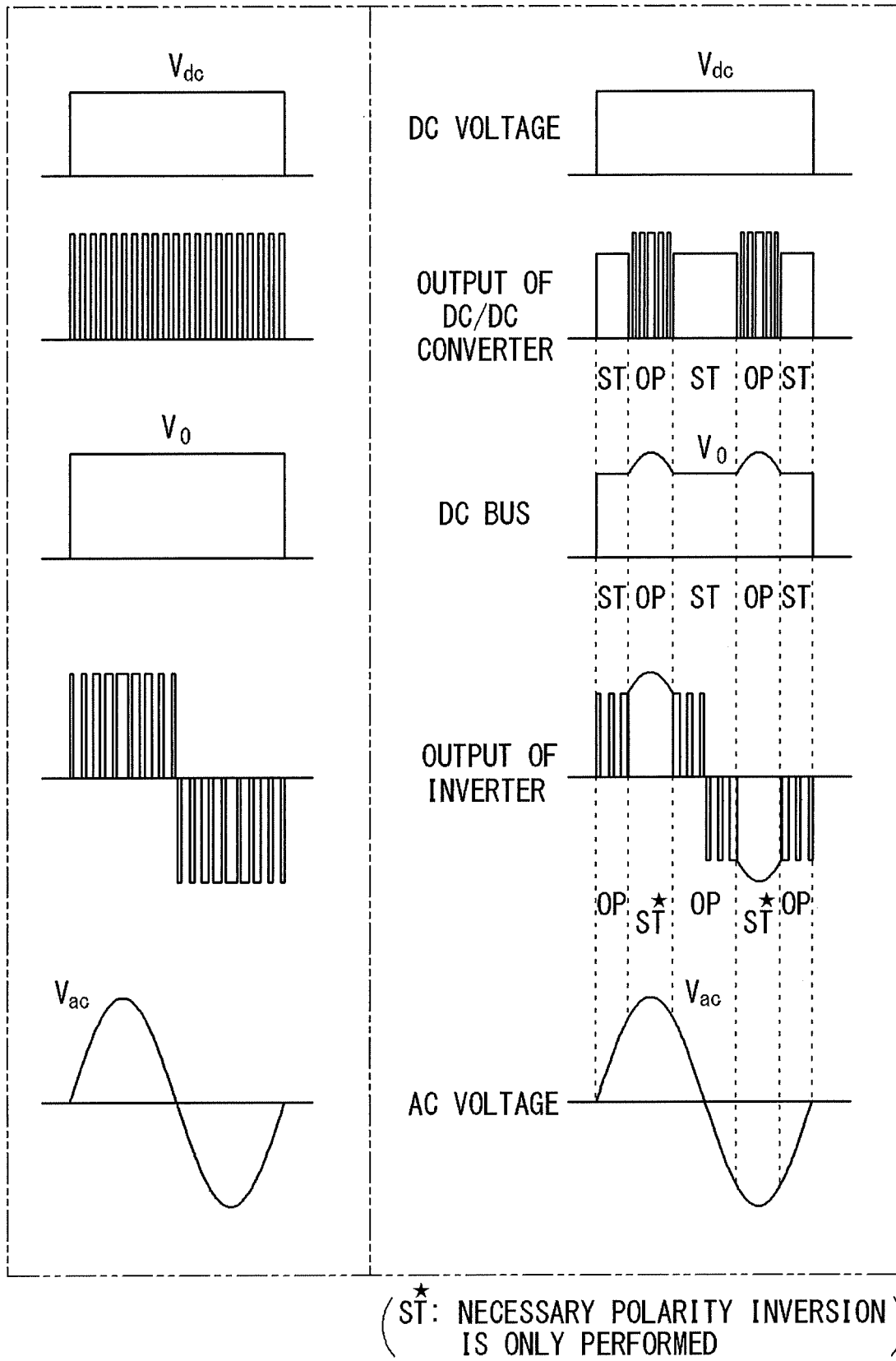
FIG. 4 is a waveform diagram (vertically depicted) schematically showing the features of operations of the DC/DC converter and the inverter in the minimum switching conversion method.

FIG. 3 and FIG. 4 are waveform diagrams schematically showing the features of operations of the DC/DC converter 11 and the inverter 13 in the minimum switching conversion method. FIG. 3 and FIG. 4 show the same content, but in particular, FIG. 3 is a horizontally depicted style so that the relationship of amplitudes from DC input to AC output can be easily understood, and in particular, FIG. 4 is a vertically depicted style so that the timings of the control can be easily understood. The upper stage in FIG. 3 and the left column in FIG. 4 are waveform diagrams showing conventional switching control which is not based on the minimum switching conversion method, for comparison. The lower stage in FIG. 3 and the right column in FIG. 4 are waveform diagrams showing operation in the minimum switching conversion method.

First, in the upper stage in FIG. 3 (or the left column in FIG. 4), in the conventional switching control, output of the DC/DC converter in response to the inputted DC voltage $V_{dc}$ is a pulse train having a higher value than $V_{dc}$ and arranged at regular intervals. This output is smoothed by the intermediate capacitor and then arises as voltage $V_O$ on the DC bus. On the other hand, the inverter performs switching under PWM (Pulse Width Modulation) control while inverting the polarity per half cycle. As a result, sinusoidal AC voltage $V_{ac}$ is obtained through final smoothing.

Next, in the minimum switching conversion method at the lower stage in FIG. 3, the DC/DC converter 11 and the inverter 13 operate in accordance with a result of comparison between the absolute value of the instantaneous value of the voltage target value $V_{ac}$ having an AC waveform, and the DC voltage $V_{dc}$ which is the input. That is, when the absolute value of the voltage target value $V_{ac}$ satisfies $V_{ac} < V_{dc}$ (or $V_{ac} \leq V_{dc}$), the DC/DC converter 11 is stopped ("ST" in the drawing), and when the absolute value of the voltage target value $V_{ac}$ satisfies $V_{ac} \geq V_{dc}$ (or $V_{ac} > V_{dc}$), the DC/DC converter 11 performs step-up operation ("OP" in the drawing). The output of the DC/DC converter 11 is smoothed by the intermediate capacitor 15, and then arises as voltage $V_O$ on the DC bus 12 as shown in the drawing.

Here, the intermediate capacitor 15 has a small capacitance (for example, microfarad level). Therefore, a part of the waveform, around the peak of the absolute value of the AC waveform, is left as it is without being smoothed. That is, the intermediate capacitor 15 has such a small capacitance that, while the smoothing acts to such an extent that eliminates the trace of the high-frequency switching by the DC/DC converter 11, a low-frequency wave having such a frequency twice as high as the commercial frequency cannot be smoothed.

On the other hand, as for the inverter 13, in accordance with a result of comparison between the absolute value of the voltage target value $V_{ac}$, and the DC voltage $V_{dc}$, when $V_{ac} < V_{dc}$ (or $V_{ac} \leq V_{dc}$) is satisfied, high-frequency switching is performed ("OP" in the drawing), and when $V_{ac} \geq V_{ac}$ (or $V_{ac} > V_{ac}$) is satisfied, the high-frequency switching is stopped ("ST" in the drawing). When the inverter 13 stops high-frequency switching, the inverter 13 selects either the state in which the switching elements Q5, Q8 are ON and the switching elements Q6, Q7 are OFF, or the state in which the switching elements Q5, Q8 are OFF and the switching elements Q6, Q7 are ON, thereby only performing necessary polarity inversion. The output of the inverter 13 is smoothed by the AC reactor 16 and the AC-side capacitor 17, whereby desired AC output is obtained.

Here, as shown in the right column in FIG. 4, the DC/DC converter 11 and the inverter 13 alternately perform high-frequency switching. When the DC/DC converter 11 performs step-up operation, the inverter 13 stops high-frequency switching and only performs necessary polarity inversion for voltage of the DC bus 12. On the other hand, when the inverter 13 performs high-frequency switching operation, the DC/DC converter 11 is stopped and voltage between both ends of the low-voltage-side capacitor 14 arises on the DC bus 12 via the DC reactor 11L and the diode d3.

As described above, the operations by the DC/DC converter 11 and the inverter 13 in the minimum switching conversion method are performed.

<<Control of Second DC/DC Converter>>

Next, control of the second (external) DC/DC converter 8 will be described.

Figure 5:
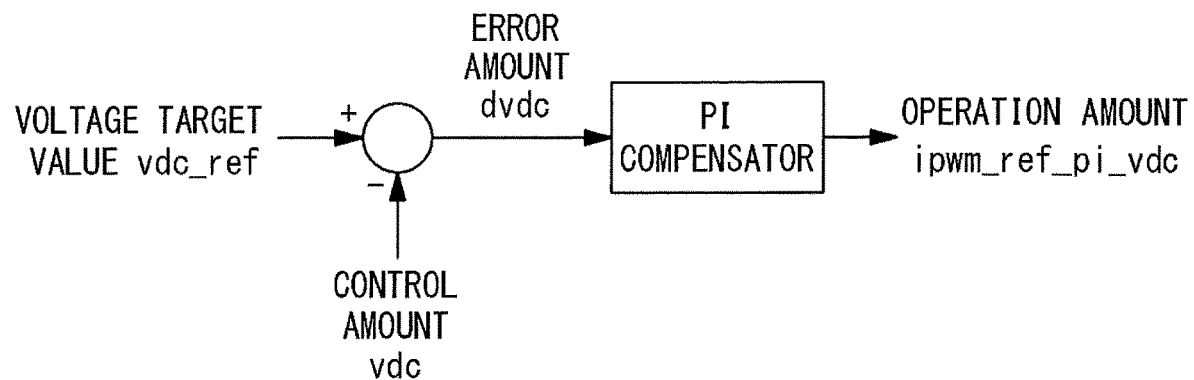
FIG. 5 is a voltage control block diagram on the high-voltage side of a second DC/DC converter.

FIG. 5 is a voltage control block diagram on the high-voltage side of the DC/DC converter 8. The main unit that executes the control is the control unit 80. In FIG. 5, using, as a control amount, a voltage detection value vdc on the high-voltage side detected by the voltage sensor 85 (FIG. 2), the control unit 80 calculates an error amount dvdc between a voltage target value vdc_ref on the high-voltage side and the control amount vdc. Then, the control unit 80 processes the error amount dvdc through a PI compensator, to calculate an operation amount ipwm_ref_pi_vdc.

An expression for calculating a current target value igdc_ref for the DC reactor 8L is shown below.

It is noted that there is no meaning in the difference in character font (upright type/italic type), and identical characters represent the same amount (the same applies hereafter).

$$\mathrm{igdc\_ref} = \frac{1}{T} \int_{t}^{t+T} \left( \mathrm{ipwm\_ref\_pi\_vdc} \times \frac{\mathrm{vdc\_ref}}{\mathrm{vgdc}} \right) dt$$

In the above expression, the operation amount ipwm_ref_pi_vdc calculated in the voltage control block diagram on the high-voltage side physically means current inputted to and outputted from the high-voltage-side capacitor 82 of the DC/DC converter 8. Therefore, in calculation of a current target value for the DC reactor 8L in the DC/DC converter 8, the voltage target value vdc_ref on the high-voltage side is divided by a voltage detection value vgdc on the storage battery side detected by the voltage sensor 83 (FIG. 2), and then the operation amount ipwm_ref_pi_vdc is multiplied by the value obtained by the division, thus performing conversion to the current target value for the DC reactor 8L. Then, the converted value is averaged over a certain cycle T which is longer than a PWM cycle, thereby obtaining a current target value igdc_ref for the DC reactor 8L. Since the purpose is to remove an AC component, T is set at the AC cycle (for example, 1/60 [s]) or half the AC cycle.

Figure 6:
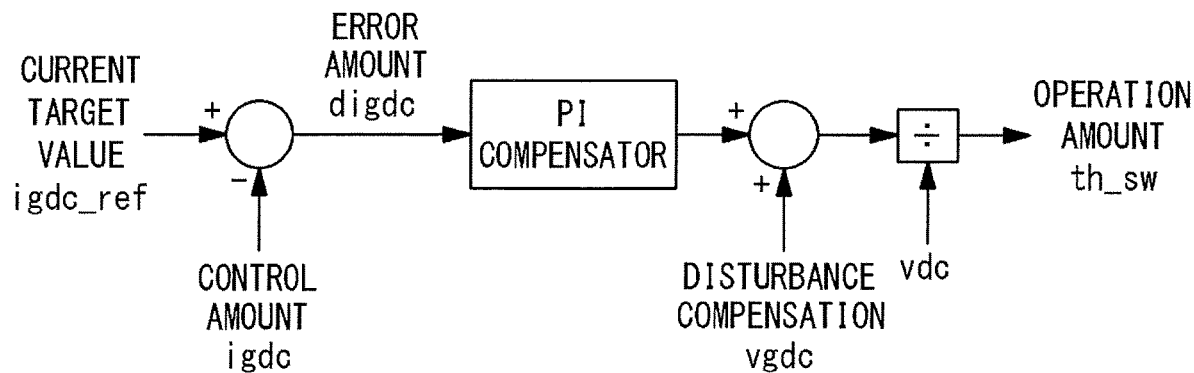
FIG. 6 is a current control block diagram for a DC reactor in the second DC/DC converter.

FIG. 6 is a current control block diagram for the DC reactor 8L in the DC/DC converter 8. Using, as a control amount, a current detection value igdc for the DC reactor 8L detected by the current sensor 84, the control unit 80 calculates an error amount digdc between the current target value igdc_ref for the DC reactor 8L and the control amount.

Then, the control unit 80 processes the error amount digdc through a PI compensator, adds, to the calculation result, the voltage detection value vgdc on the storage battery side as a disturbance compensation, and further divides the calculation result by the voltage detection value vdc on the high-voltage side. Thus, an operation amount th_sw is calculated. Using this operation amount, the duties for the switching elements Q1, Q2 of the DC/DC converter 8 are determined.

The DC/DC converter 8 outputs voltage that coincides with the highest one of output voltages of the photovoltaic panels 7A, 7B, 7C, to the high-voltage side.

In a case where the DC/DC converter 8 outputs voltage that coincides with the highest one of output voltages of the photovoltaic panels 7A, 7B, 7C, to the high-voltage side, the switching stop period of the DC/DC converter 11 increases. This contributes to optimization of the operation by the minimum switching conversion method in the power conditioner 1.

Similarly, it is also possible that the DC/DC converter 11 outputs voltage that coincides with the highest one of output voltages of the photovoltaic panels 7A, 7B, 7C, to the low-voltage side.

<<Verification>>

The result of control of the DC/DC converter 8 described above will be verified. Here, a case where power of about 1.5 kW is charged from the commercial power system 3 to the storage battery 6 is shown as an example.

Figure 7:
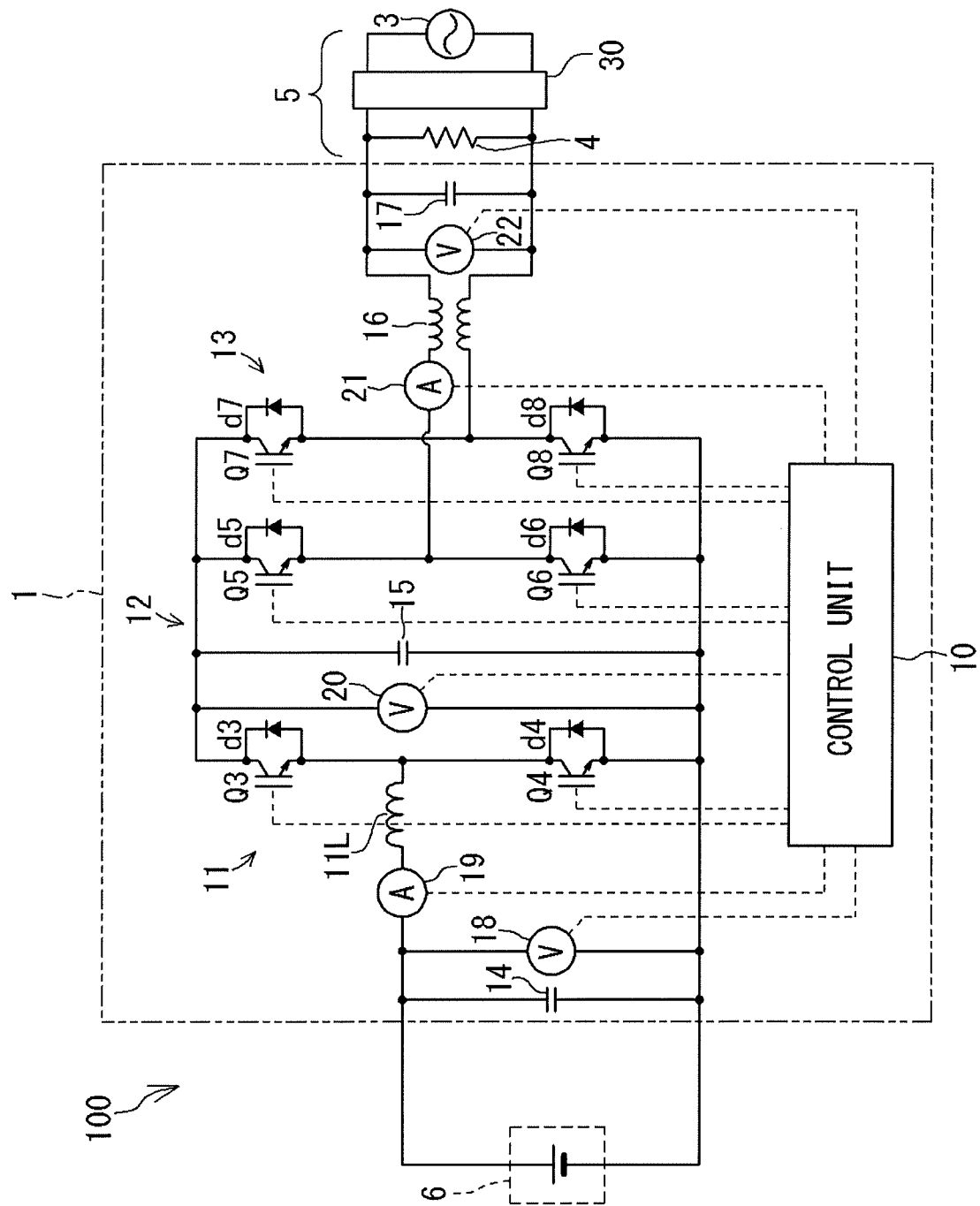
FIG. 7 is a circuit diagram obtained by removing the second DC/DC converter from FIG. 2, for comparison.
Figure 8:
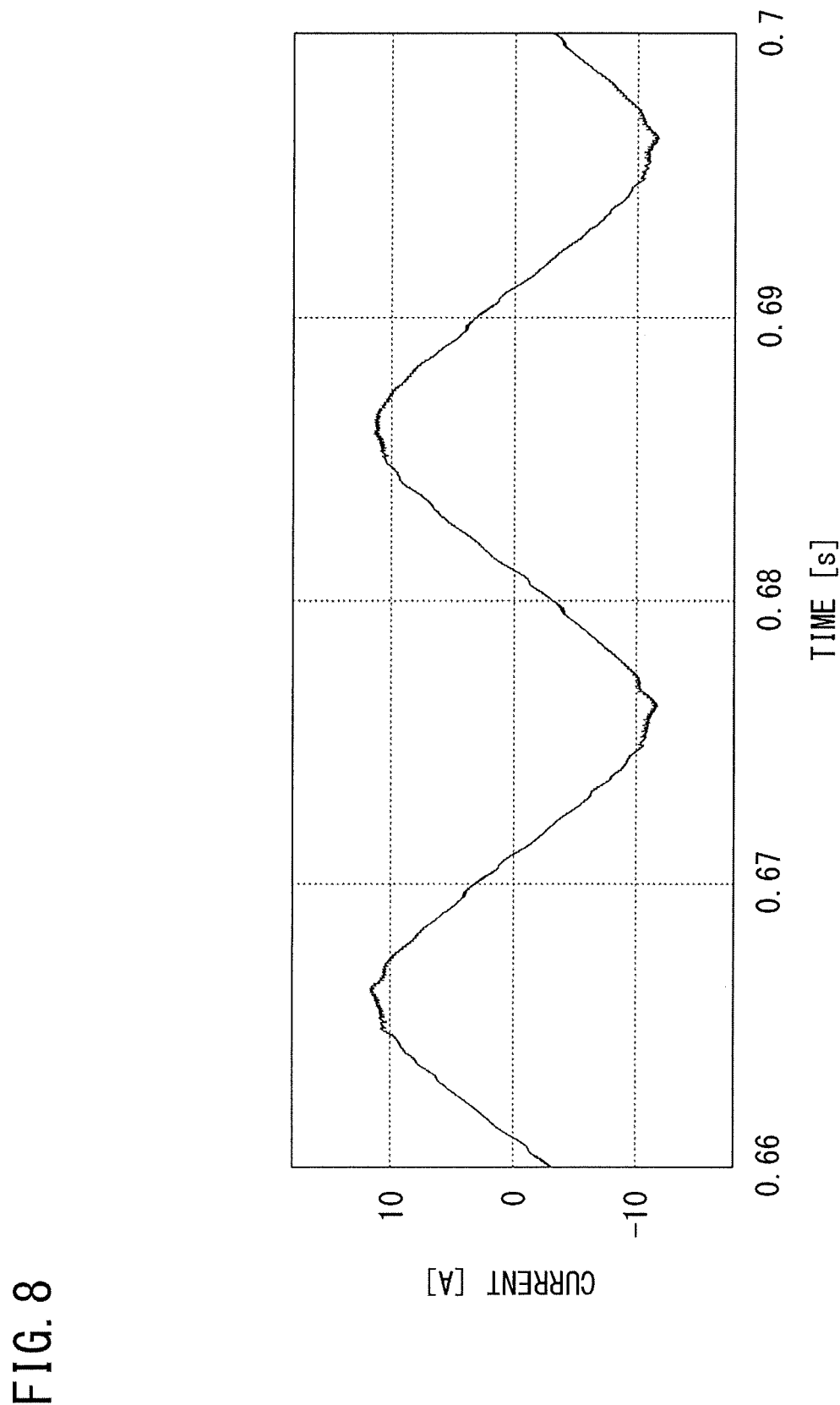
FIG. 8 is a waveform diagram of system current detected by a current sensor in the circuit in FIG. 7.
Figure 9:
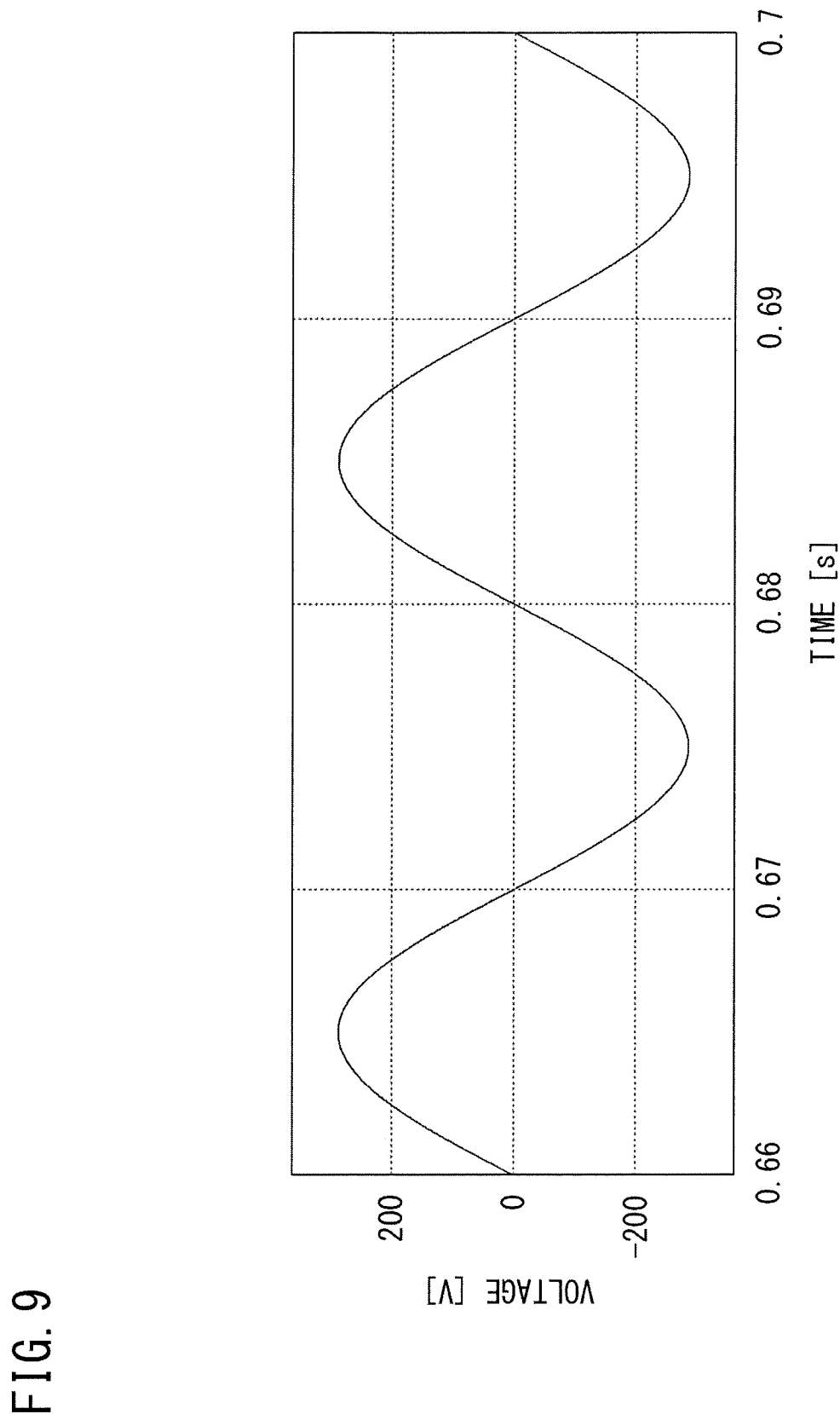
FIG. 9 is a waveform diagram of system voltage detected by a voltage sensor in the circuit in FIG. 7.
Figure 10:
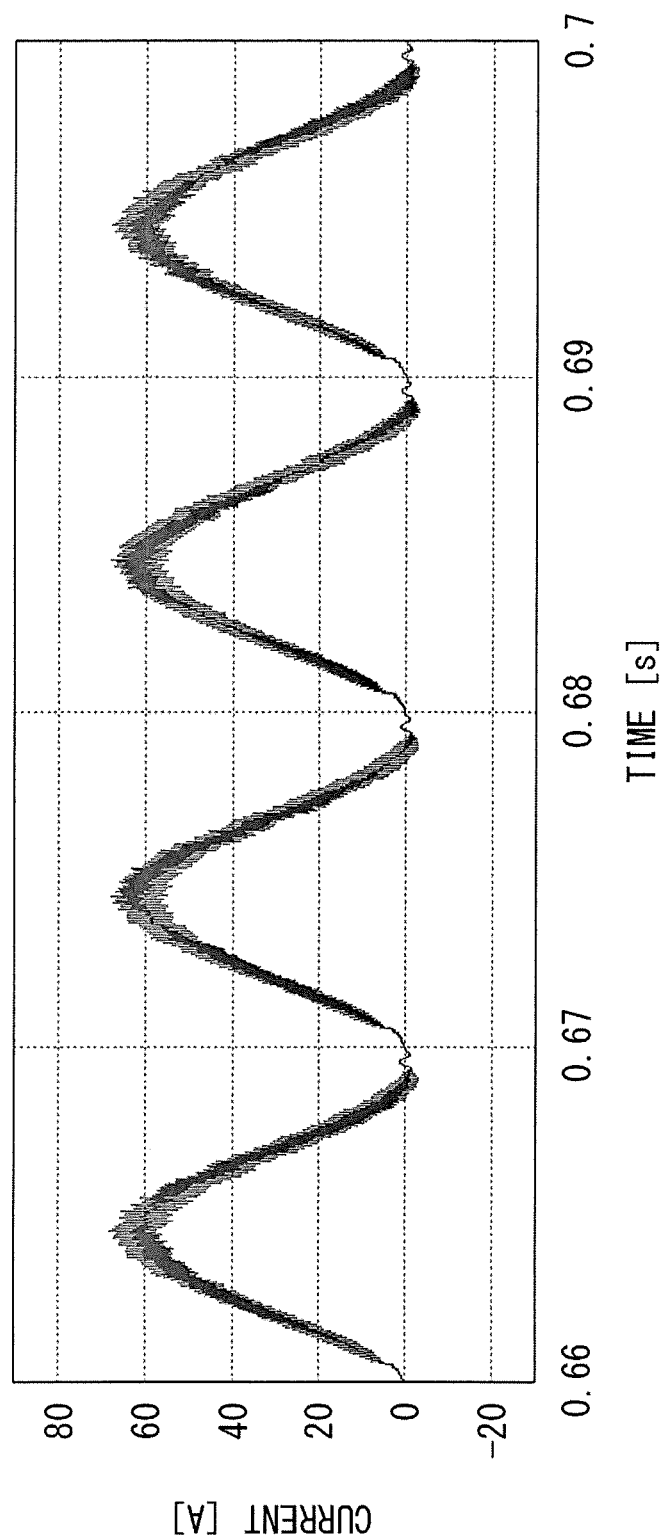
FIG. 10 is a waveform diagram of charge current to the storage battery, detected by a current sensor in the circuit in FIG. 7.

FIG. 7 is a circuit diagram obtained by removing the DC/DC converter 8 from FIG. 2, for comparison. FIG. 8 is a waveform diagram of system current (having a frequency of 50 Hz) detected by the current sensor 21 in the circuit in FIG. 7. FIG. 9 is a waveform diagram of system voltage (having a frequency of 50 Hz) detected by the voltage sensor 22 in the circuit in FIG. 7. FIG. 10 is a waveform diagram of charge current to the storage battery 6, detected by the current sensor 19 in the circuit in FIG. 7. By the minimum switching conversion method, the charge current pulsates and has an average value of 29.6 [A] and a peak value of 68 [A] as seen from zero, and the pulsation cycle is half the AC cycle.

Next, waveform diagrams for the power conversion system 100 shown in the circuit in FIG. 2 will be described.

A waveform diagram of system current (having a frequency of 50 Hz) detected by the current sensor 21, and a waveform diagram of system voltage (having a frequency of 50 Hz) detected by the voltage sensor 22, are the same as those in FIG. 8 and FIG. 9, respectively.

Figure 11:
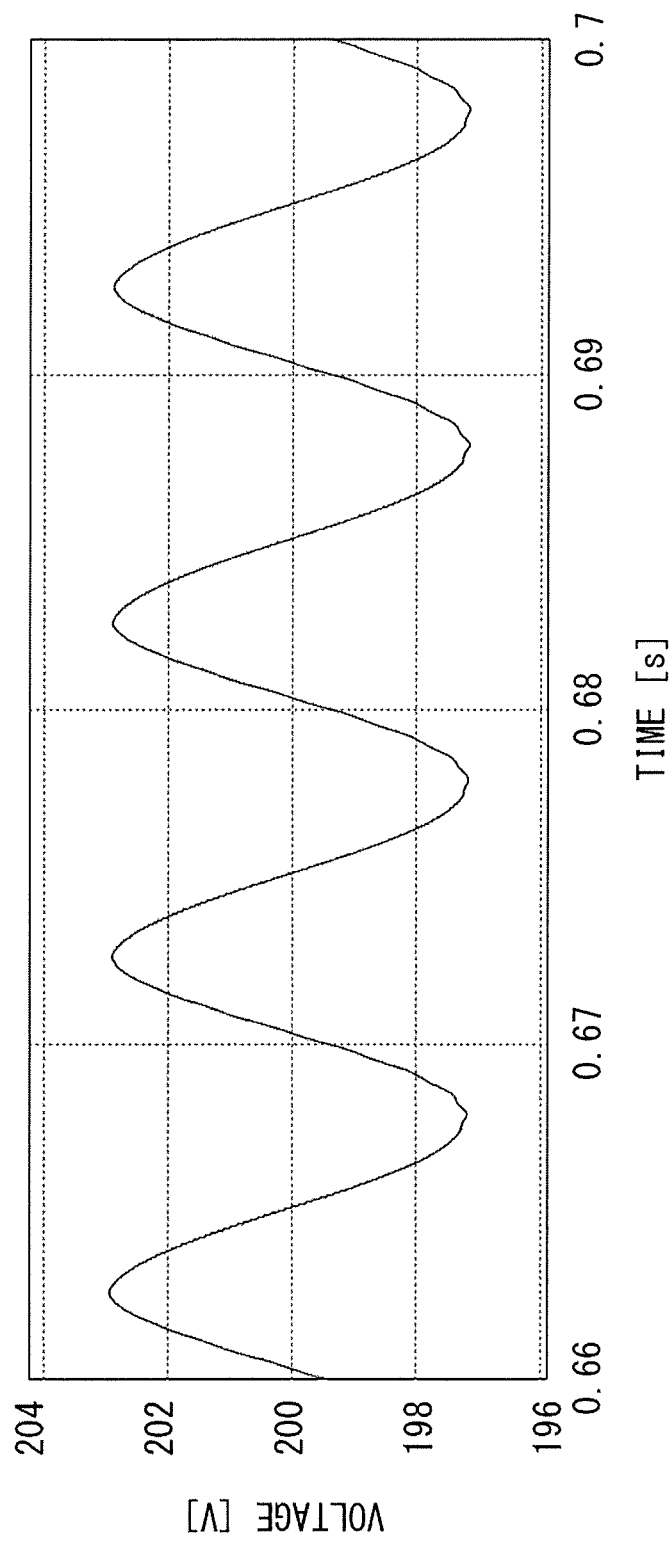
FIG. 11 is a waveform diagram of voltage, at the mutual connection point between the DC/DC converter and a power conditioner, detected by a voltage sensor.

FIG. 11 is a waveform diagram of voltage, at the mutual connection point between the DC/DC converter 8 and the power conditioner 1, detected by the voltage sensors 18, 85. In this waveform diagram, the scale is expanded in the vertical axis direction. The average value is 200 [V] and the peak-to-peak value is 6 [V].

Figure 12:
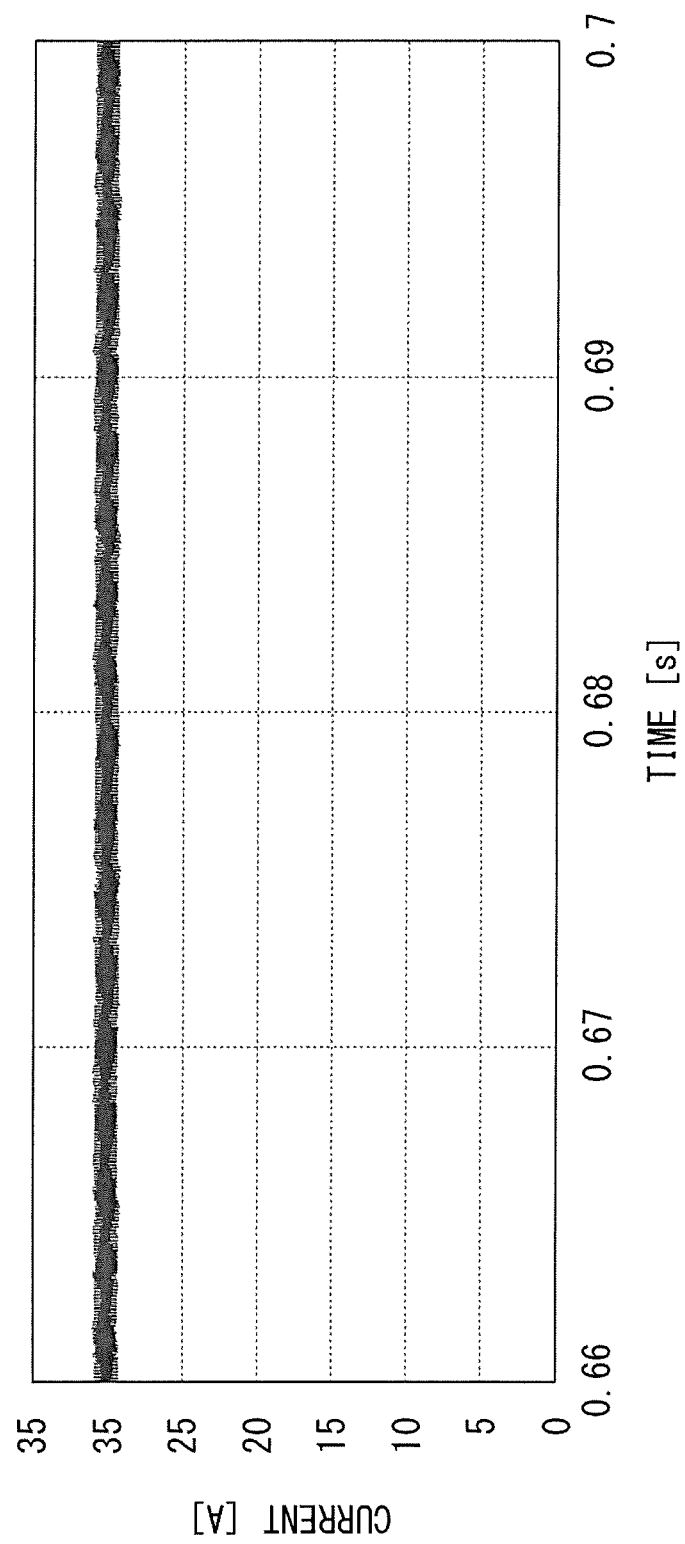
FIG. 12 is a waveform diagram of charge current to the storage battery, detected by a current sensor in the circuit in FIG. 2.

FIG. 12 is a waveform diagram of charge current to the storage battery 6, detected by the current sensor 84 in the circuit in FIG. 2. As shown in FIG. 12, it is found that the charge current can be considered to be DC current, though there is extremely minute variation. The average value of the current is 30.2 [A] and the peak-to-peak value is 1.8 [A].

From the verification result described above, it is indicated that charge current to the storage battery 6 becomes DC current by providing the DC/DC converter 8 between the storage battery 6 and the power conditioner 1 and performing predetermined control. Although the charging case has been described here, also in a case of discharging the storage battery 6, the discharge current becomes DC current in the same manner.

If the charge/discharge current becomes DC current, loss due to the internal resistance of the storage battery 6 reduces to ⅔ as compared to a case of performing charging and discharging with pulsating current having the same average value.

<<Communication>>

By providing the DC/DC converter 8 between the storage battery 6 and the power conditioner 1, it is possible to cause the control unit 80 for the DC/DC converter 8 to mediate the communication. For example, if the DC/DC converter 8 is provided with various types of communication interface functions for communication with the storage battery 6, communication with the DC/DC converter 8 can be performed even if the storage batteries 6 having various communication specifications depending on storage battery manufacturers are used, for example. From the perspective of the power conditioner 1, as long as communication with the DC/DC converter 8 is allowed, it is unnecessary to consider the communication specifications of the storage batteries 6, and this is very convenient in practical use.

Figure 13:
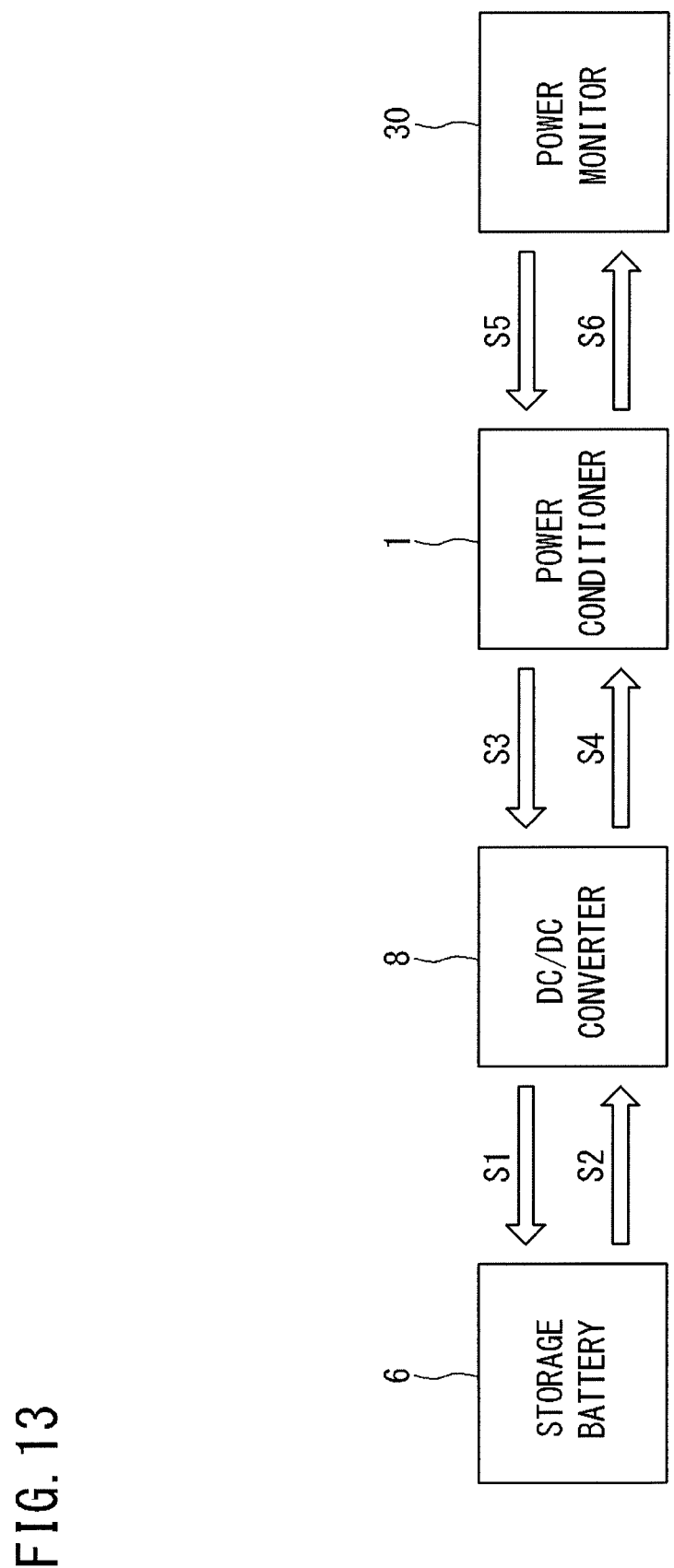
FIG. 13 is a diagram showing an example of transmission and reception of information signals.

FIG. 13 is a diagram showing an example of transmission and reception of information signals. Signals S1, S2 are transmitted and received between the DC/DC converter 8 and the storage battery 6. Signals S3, S4 are transmitted and received between the power conditioner 1 and the DC/DC converter 8. Signals S5, S6 are transmitted and received between the power monitor 30 and the power conditioner 1.

Examples of the contents of the signals are as follows. PCS, PV, and DC/DC are abbreviations referring to the power conditioner, the photovoltaic panel, and the DC/DC converter 8, respectively.

S1: operation start command, operation stop command

S2: voltage between both ends of storage battery, cell voltage, system operation information, current, SOC (State of Charge)

S3: DC/DC operation command, PCS operation condition

S4: DC/DC operation mode, state of request to PCS, storage battery operation information S5: PCS operation command, storage battery operation command, storage battery charge/discharge target value, PCS output power maximum value, error cancel flag S6: PCS operation content, storage battery operation content, PCS output power, each PV generated power, storage battery charge/discharge power, storage battery amount (SOC), PCS status, storage battery status, log code Summary of First Embodiment In the above power conversion system 100, even if there is a great difference in input/output voltage between the power conditioner 1 and the storage battery 6, step-up/step-down operation can be performed and in addition, the voltage applicable range is expanded. Therefore, it is possible to connect various types of storage batteries having different output voltages, to the power conditioner 1. In addition, in the minimum switching conversion method in which the first DC/DC converter 11 and the inverter 13 alternately have switching stop periods in the AC half cycle, current having a pulsating current waveform attempts to flow to the low-voltage side of the first DC/DC converter 11. However, by performing control for causing current flowing through the DC reactor 8L of the second DC/DC converter 8 to have a constant value (in other words, control for causing voltage on the high-voltage side of the DC/DC converter 8 to have a constant value), only DC current flows through the storage battery 6 and the current having a pulsating current waveform does not flow. As a result, loss due to the internal resistance of the storage battery 6 is suppressed, deterioration in the storage battery 6 is delayed, and the performance of the storage battery 6 can be fully exerted.

In addition, when the second DC/DC converter 8 controls voltage on the high-voltage side thereof to be constant voltage, the second DC/DC converter 8 performs communication for receiving a voltage target value to achieve the constant voltage, from the power conditioner 1. Through this communication, the power conditioner 1 can notify the second DC/DC converter 8 of the output voltage target value on the high-voltage side. For example, in a case where voltage that coincides with the highest one of output voltages of the photovoltaic panels is used for voltage of the DC bus 12, it is possible to notify the second DC/DC converter 8 of the output voltage target value. Thus, the second DC/DC converter 8 can output voltage that coincides with the highest one of output voltages of the photovoltaic panels, to the high-voltage side. In addition, as a result, the switching stop period of the first DC/DC converter 11 increases, and this contributes to optimization of the operation in the minimum switching conversion method.

Second Embodiment

Next, a power conversion system (including a control method therefor) according to the second embodiment will be described. The circuit configuration and the minimum switching conversion are the same as in the first embodiment.

In the second embodiment, the constant current control of the second DC/DC converter 8 in the first embodiment is performed, as it were, in a "dependent" manner, and constant voltage control for controlling voltage on the low-voltage side of the DC/DC 11 to be constant voltage is performed initiatively by the DC/DC converter 11 in the power conditioner 1.

<<Control of First DC/DC Converter>>

First, various amounts about the circuit are defined as follows. It is noted that the wording "storage battery portion . . . " below means the low-voltage-side end of the DC/DC converter 11, to be connected to the storage battery 6 via the DC/DC converter 8.

$I_{dc}$: current detection value for DC reactor 11L
$I^*_{dc}$: current target value for DC reactor 11L
$V_{dc}$: storage-battery-portion input-voltage detection value (detected value from voltage sensor 18)
$V^*_{dc}$: storage-battery-portion input-voltage target value
$C_{dc}$: combined capacitance of capacitors 14 and 82
$V_{ac}$: AC system voltage detection value (detected value from voltage sensor 22)
$I^*_{ac}$: AC output current target value
$C_{ac}$: capacitance of AC-side capacitor 17
$I^*_{inv}$: current target value for AC reactor 16
$V^*_{inv}$: voltage target value on AC side of inverter 13
$R_{inv}$: resistance component of inverter 13 (mainly, resistance component of AC reactor 16)
$L_{inv}$: inductance of AC reactor 16
$C_o$: capacitance of intermediate capacitor 15
$V_o$: voltage detection value for intermediate capacitor 15 (detected value from voltage sensor 20)
$V^*_o$: voltage target value for intermediate capacitor 15
$R_{dc}$: resistance component of DC/DC converter 11 (mainly, resistance component of DC reactor 11L)
$L_{dc}$: inductance of DC reactor 11L

First, the current detection value $I_{dc}$ for the DC reactor 11L can be written as expression (1) using the combined capacitance $C_{dc}$ and the storage-battery-portion input-voltage detection value $V_{dc}$.

$$I_{dc} = C_{dc} \frac{dV_{dc}}{dt} \quad (1)$$

By rewriting the above expression in a voltage feedback style, the following expression (2) is obtained, using f as a control frequency.

$$I_{dc} = C_{dc} f \{V^*_{dc} - V_{dc}\} \quad (2)$$

By averaging the above expression over the AC half cycle, the following expression (3) is obtained.

$$I^*_{dc\_r} = K_{dc} \left\{ V^*_{dc} - \frac{1}{T} \int_t^{t+T} V_{dc} dt \right\} \quad (3)$$

Thus, a DC component of the DC reactor current is obtained through feedback control in the AC half cycle. Here, T is the AC half cycle, and $K_{dc}$ is a compensation coefficient.

The current target value for the DC reactor 11L can be calculated by dividing (power on DC side of inverter 13)+ (charge/discharge power of intermediate capacitor 15) by voltage between the collector and the emitter of the switching element Q4 (this applies to a case of IGBT; in a case of MOSFET, voltage between the drain and the source is used). The voltage between the collector and the emitter of the switching element Q4 can be calculated by considering voltage drop due to the resistance component and the inductance $L_{dc}$ of the DC reactor 11L, from the storage-battery-portion input-voltage detection value $V_{dc}$. That is, the current target value for the DC reactor 11L is represented by the following expression (4).

$$I^*_{dc} = \frac{I^*_{inv} V^*_{inv} + C_o \frac{dV^*_o}{dt} V^*_o}{V_{dc} - \left(R_{dc} I^*_{dc} + L_{dc} \frac{dI^*_{dc}}{dt}\right)} \quad (4)$$

By averaging the above expression over the AC half cycle, the following expression (5) is obtained.

$$I^*_{dc\_r} = \frac{1}{T} \int_t^{t+T} \frac{I^*_{inv} V^*_{inv} + C_o \frac{dV^*_o}{dt} V^*_o}{V_{dc} - \left(R_{dc} I^*_{dc} + L_{dc} \frac{dI^*_{dc}}{dt}\right)} dt \quad (5)$$

Since the charge/discharge power of the intermediate capacitor 15 and the voltage drop due to the DC reactor 11L become zero when averaged over the AC half cycle, the above expression can be written as expression (6). It is noted that a notation "<>" indicates an average value.

$$I^*_{dc\_r} = \frac{\langle I^*_{inv} \rangle_{rms} \times \langle V^*_{inv} \rangle_{rms}}{V_{dc} - R_{dc} I^*_{dc\_r}} \quad (6)$$

The current target value $I^*_{inv}$ for the AC reactor 16 is represented by expression (7) using the AC output current target value $I^*_{ac}$ and charge/discharge current of the AC-side capacitor $C_{ac}$.

$$I^*_{inv} = I^*_{ac} + C_{ac}\frac{dV_{ac}}{dt} \quad (7)$$

By calculating the effective value in the AC cycle, the charge/discharge current of the AC-side capacitor 17 becomes zero, and thus the following expression (8) is obtained.

$$\langle I^*_{inv}\rangle_{rms} = \langle I^*_{ac}\rangle_{rms} \quad (8)$$

The voltage target value $V^*_{inv}$ for the inverter 13 is represented as the following expression (9) by considering voltage drop due to the resistance component and the inductance component of the AC reactor 16, from the AC system voltage detection value $V_{ac}$.

$$V^*_{inv} = V_{ac} - \left(R_{inv}I^*_{inv} + L_{inv}\frac{dI^*_{inv}}{dt}\right) \quad (9)$$

By calculating the effective value in the AC cycle, the voltage drop due to the AC reactor 16 becomes zero, and by substituting expression (8) into the above expression, the following expression (10) is obtained.

$$\langle V^*_{inv}\rangle_{rms} = \langle V_{ac}\rangle_{rms} - R_{inv}\langle I^*_{inv}\rangle_{rms} = \langle V_{ac}\rangle_{rms} - R_{inv}\langle I^*_{ac}\rangle_{rms} \quad (10)$$

By substituting expression (8) and expression (10) into expression (6), the following expression (11) is obtained.

$$I^*_{dc\_r} = \frac{\langle I^*_{ac}\rangle_{rms} \times (\langle V_{ac}\rangle_{rms} - R_{inv}\langle I^*_{ac}\rangle_{rms})}{V_{dc} - R_{dc}I^*_{dc\_r}} \quad (11)$$

By solving the above expression for $\langle I^*_{ac}\rangle_{rms}$, the following expression (12) is obtained, and by using, as $I^*_{dc\_r}$, the one calculated from expression (3), the effective value of the AC output current is obtained.

$$\langle I^*_{ac}\rangle_{rms} = \frac{\langle V_{ac}\rangle_{rms}}{2R_{inv}} \pm \sqrt{\frac{\langle V_{ac}\rangle^2_{rms}}{4R^2_{inv}} - \frac{I^*_{dc\_r}(V_{dc} - R_{inv}I^*_{dc\_r})}{R_{inv}}} \quad (12)$$

If the values of $\langle I^*_{ac}\rangle_{rms}$ and $\langle V_{ac}\rangle_{rms}$ are determined, it is possible to generate $I^*_{ac}$ and $V^*_{ac}$ synchronized with the AC voltage through PLL (Phase Locked Loop), and by substituting these into expression (7), the current target value $I^*_{inv}$ for the inverter 13 is obtained. In addition, $V^*_{inv}$ is obtained from expression (9), and the DC reactor current target value $I^*_{dc}$ is obtained from expression (4).

Through the above calculation, it becomes possible to perform system interconnection operation of the power conditioner 1 by the minimum switching conversion method depending on the constant voltage control on the low-voltage side in the DC/DC converter 11 of the power conditioner 1.

Thus, as a waveform diagram of the charge/discharge current of the storage battery 6, the same result as in FIG. 12 described above is obtained.

Figure 14A:
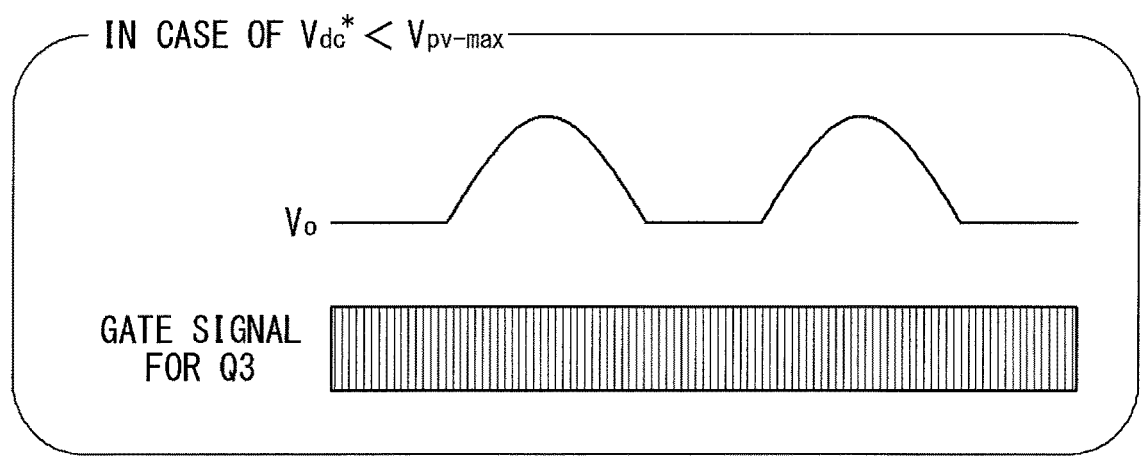
FIG. 14A is a diagram showing an example of switching operation of the DC/DC converter.
Figure 14B:
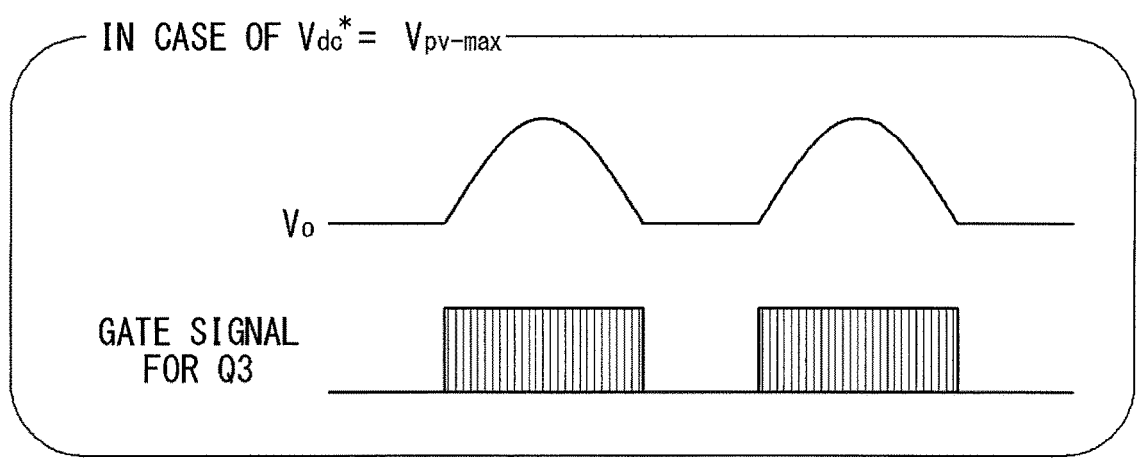
FIG. 14B is a diagram showing another example of switching operation of the DC/DC converter.

FIG. 14A and FIG. 14B are diagrams showing two examples of switching operation of the DC/DC converter 11.

Although the voltage target value $V_{dc}^*$ for the intermediate capacitor 15 is set to constant voltage, in a case where the maximum voltage value of voltage generated during photovoltaic generation is $V_{pv\text{-}max}$, if $V_{dc}^* < V_{pv\text{-}max}$ is satisfied, the minimum voltage of voltage $V_o$ of the intermediate capacitor 15 becomes $V_{pv\text{-}max}$. Thus, the DC/DC converter 11 always performs step-up operation or step-down operation, and minimum switching conversion cannot be achieved, resulting in reduction in the conversion efficiency (FIG. 14A). Therefore, by setting the value of $V_{dc}^*$ to $V_{pv\text{-}max}$, unnecessary step-up operation of the DC/DC converter 11 is not performed, resulting in improvement in the conversion efficiency (FIG. 14B).

Summary of Second Embodiment

As described above, in the second embodiment, a value obtained by averaging, over the AC half cycle, the compensation amount based on voltage feedback on the low-voltage side of the first DC/DC converter 11, is determined as a current target value for the DC reactor 11L of the first DC/DC converter 11, whereby voltage on the low-voltage side of the first DC/DC converter 11 can be controlled to be constant voltage.

By performing constant voltage control for causing voltage on the low-voltage side of the first DC/DC converter 11 to have a constant value, the second DC/DC converter 8 performs constant current control initiatively by the first DC/DC converter 11 so that current flowing through the second DC/DC converter 8 can be caused to have a constant value.

Thus, in the storage battery 6, only DC current flows and current having a pulsating current waveform does not flow. As a result, loss due to the internal resistance of the storage battery 6 is suppressed, deterioration in the storage battery 6 is delayed, and the performance of the storage battery 6 can be fully exerted.

In addition, when the first DC/DC converter 11 controls voltage on the low-voltage side thereof to be constant voltage, the first DC/DC converter 11 can perform communication for transmitting an output power command value to the second DC/DC converter 8. In this case, by the second DC/DC converter 8 being notified of the output power command value, the second DC/DC converter 8 can control the charge/discharge current to be constant current based on the output power command value.

SUPPLEMENTARY NOTE

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

Needless to say, the power conversion system including all the components as disclosed in the specification and the drawings is also included in the present invention.

REFERENCE SIGNS LIST

1 power conditioner
3 commercial power system
4 load
5 AC electric path 6 storage battery
7A, 7B, 7C photovoltaic panel
8 DC/DC converter
8L DC reactor
9 DC power supply circuit
10 control unit
11 DC/DC converter
11L DC reactor
12 DC bus
13 inverter
14 low-voltage-side capacitor
15 intermediate capacitor
16 AC reactor
17 AC-side capacitor
18, 20, 22 voltage sensor
19, 21 current sensor
30 power monitor
80 control unit
81 low-voltage-side capacitor
82 high-voltage-side capacitor
83, 85 voltage sensor
84 current sensor
100 power conversion system
d1 to d8 diode
Q1 to Q8 switching element

The invention claimed is:

1. A power conversion system comprising a DC power supply circuit and a power conditioner which are connected to each other, wherein
the power conditioner includes:
a first DC/DC converter provided between the DC power supply circuit and a DC bus; and
an inverter provided between the DC bus and an AC electric path and configured to perform switching operation in such a manner that the inverter and the first DC/DC converter alternately have stop periods in an AC half cycle, and
the DC power supply circuit includes:
a storage battery; and
a second DC/DC converter of a bidirectional type, provided between the storage battery and the first DC/DC converter and including a DC reactor,
the power conversion system comprising a control unit configured to control current flowing through the DC reactor of the second DC/DC converter to have a substantially constant value and to remove pulsations from the current waveform;
wherein the power conversion system reduces loss due to internal resistance of the storage battery by the control unit controlling the current flowing through the DC reactor of the second DC/DC converter.

2. The power conversion system according to claim 1, wherein
the control unit determines, as a charge/discharge current target value, a value obtained by averaging, over a certain cycle, a value calculated by multiplying an operation amount of voltage feedback control on a high-voltage side of the second DC/DC converter by a value obtained by dividing a voltage target value on the high-voltage side by a voltage detection value on a low-voltage side thereof, and controls voltage on the high-voltage side of the second DC/DC converter to be a constant voltage.

3. The power conversion system according to claim 2, wherein
the following expression is satisfied:

$$\text{igdc\_ref} = \frac{1}{T}\int_{t}^{t+T}\left(\text{ipwm\_ref\_pi\_vdc} \times \frac{\text{vdc\_ref}}{\text{vgdc}}\right)dt$$

where T is the cycle,
igdc_ref is the charge/discharge current target value,
ipwm_ref_pi_vdc is the operation amount,
vdc_ref is the voltage target value, and
vgdc is the voltage detection value.

4. The power conversion system according to claim 3, wherein
the power conditioner is a complex-type power conditioner connected also to one or a plurality of photovoltaic panels, and
the second DC/DC converter controls output, to the high-voltage side thereof, of voltage that coincides with the highest one of output voltages of the photovoltaic panels.

5. The power conversion system according to claim 4, wherein
when the second DC/DC converter controls voltage on the high-voltage side thereof to be the constant voltage, the second DC/DC converter performs communication for receiving the voltage target value to achieve the constant voltage, from the power conditioner.

6. The power conversion system according to claim 3, wherein
when the second DC/DC converter controls voltage on the high-voltage side thereof to be the constant voltage, the second DC/DC converter performs communication for receiving the voltage target value to achieve the constant voltage, from the power conditioner.

7. The power conversion system according to claim 2, wherein
the power conditioner is a complex-type power conditioner connected also to one or a plurality of photovoltaic panels, and
the second DC/DC converter controls output, to the high-voltage side thereof, of voltage that coincides with the highest one of output voltages of the photovoltaic panels.

8. The power conversion system according to claim 7, wherein
when the second DC/DC converter controls voltage on the high-voltage side thereof to be the constant voltage, the second DC/DC converter performs communication for receiving the voltage target value to achieve the constant voltage, from the power conditioner.

9. The power conversion system according to claim 2, wherein
when the second DC/DC converter controls voltage on the high-voltage side thereof to be the constant voltage, the second DC/DC converter performs communication for receiving the voltage target value to achieve the constant voltage, from the power conditioner.

10. The power conversion system according to claim 1, wherein
the control unit determines, as a current target value for a DC reactor included in the first DC/DC converter, a value obtained by averaging, over an AC half cycle, a compensation amount based on voltage feedback on a low-voltage side of the first DC/DC converter, and controls voltage on the low-voltage side of the first DC/DC converter to be a constant voltage.

11. The power conversion system according to claim 10, wherein
the power conditioner is a complex-type power conditioner connected also to one or a plurality of photovoltaic panels, and
the first DC/DC converter controls output, to the low-voltage side thereof, of voltage that coincides with the highest one of output voltages of the photovoltaic panels.

12. The power conversion system according to claim 11, wherein
when the first DC/DC converter controls voltage on the low-voltage side thereof to be the constant voltage, the first DC/DC converter performs communication for transmitting an output power command value to the second DC/DC converter.

13. The power conversion system according to claim 10, wherein
when the first DC/DC converter controls voltage on the low-voltage side thereof to be the constant voltage, the first DC/DC converter performs communication for transmitting an output power command value to the second DC/DC converter.

14. The power conversion system according to claim 1, wherein the power conversion system reduces loss due to internal resistance of the storage battery to ⅔ as compared to a case of performing charging and discharging with pulsating current having the same average value.

15. A control method for a power conversion system, to be mainly executed by the power conversion system, the power conversion system comprising a DC power supply circuit and a power conditioner which are connected to each other, the power conditioner including: a first DC/DC converter provided between the DC power supply circuit and a DC bus; and an inverter provided between the DC bus and an AC electric path, the DC power supply circuit including: a storage battery; and a second DC/DC converter of a bidirectional type, provided between the storage battery and the first DC/DC converter and including a DC reactor, wherein
the second DC/DC converter steps up voltage on the storage battery to voltage on a low-voltage side of the first DC/DC converter, or performs step-down operation in a direction opposite thereto,
the first DC/DC converter and the inverter perform switching operations so as to alternately have stop periods in an AC half cycle, and
current flowing through the DC reactor of the second DC/DC converter is controlled to have a substantially constant value and to remove pulsations from the current waveform;
wherein the power conversion system reduces loss due to internal resistance of the storage battery by the control unit controlling the current flowing through the DC reactor of the second DC/DC converter.

16. A power conversion system comprising a DC power supply circuit and a power conditioner which are connected to each other, wherein
the power conditioner includes:
a first DC/DC converter provided between the DC power supply circuit and a DC bus; and
an inverter provided between the DC bus and an AC electric path and configured to perform switching operation in such a manner that the inverter and the first DC/DC converter alternately have stop periods in an AC half cycle, and
the DC power supply circuit includes:
a storage battery; and
a second DC/DC converter of a bidirectional type, provided between the storage battery and the first DC/DC converter and including a DC reactor,
the power conversion system comprising:
a capacitor provided between the first DC/DC converter and the second DC/DC converter; and
a control unit configured to control current flowing through the DC reactor of the second DC/DC converter to have a substantially constant value and a non-pulsating current waveform, by the capacitor supplying a pulsating component of pulsating current flowing through the first DC/DC converter, and by the second DC/DC converter supplying a DC component of the pulsating current;
wherein the power conversion system reduces loss due to internal resistance of the storage battery by the control unit controlling the current flowing through the DC reactor of the second DC/DC converter.

* * * * *